US012268654B2

(12) United States Patent
Zhang

(10) Patent No.: US 12,268,654 B2
(45) Date of Patent: Apr. 8, 2025

(54) NEGATIVE PRESSURE MASSAGER AND MASSAGE METHOD

(71) Applicant: Xiaobin Zhang, Yingshan (CN)

(72) Inventor: Xiaobin Zhang, Yingshan (CN)

( * ) Notice: Subject to any disclaimer, the term of this patent is extended or adjusted under 35 U.S.C. 154(b) by 0 days.

(21) Appl. No.: 18/764,469

(22) Filed: Jul. 5, 2024

(65) Prior Publication Data

US 2024/0358582 A1 Oct. 31, 2024

(51) Int. Cl.
*A61H 9/00* (2006.01)
*A61H 19/00* (2006.01)

(52) U.S. Cl.
CPC ........... *A61H 9/0057* (2013.01); *A61H 19/30* (2013.01); *A61H 2201/1215* (2013.01); *A61H 2201/1436* (2013.01)

(58) Field of Classification Search
CPC ........ A61H 9/0057; A61H 9/005; A61H 9/00; A61H 9/0007; A61H 19/30; A61H 19/34; A61H 2201/1215; A61H 2201/1436
See application file for complete search history.

(56) References Cited

U.S. PATENT DOCUMENTS 11,452,665 B1 * 9/2022 Yu ........................ A61H 9/0057
2007/0149903 A1 * 6/2007 Nan ........................ A61H 19/44
601/72
2020/0179220 A1 * 6/2020 Jablow ..................... A61H 1/00
2020/0405562 A1 12/2020 Kodama
2021/0137775 A1 5/2021 Kim et al.
2021/0338523 A1 * 11/2021 Zheng .................... A61H 19/44
2021/0393475 A1 * 12/2021 He ......................... A61H 19/34
2022/0110819 A1 * 4/2022 Guo ..................... A61H 9/0057
2022/0160577 A1 * 5/2022 Cai .................... A61H 23/0263
2022/0409470 A1 * 12/2022 He .......................... F04B 35/01
2023/0027905 A1 * 1/2023 Yu ........................ A61H 23/006
2023/0172793 A1 * 6/2023 Witt ...................... A61H 9/0057
600/38
2023/0210712 A1 * 7/2023 Zhong ................ A61H 23/0218
601/7
2023/0320924 A1 * 10/2023 Zhou .................... A61H 9/0057
601/6
2024/0122786 A1 * 4/2024 Yu ........................ A61H 9/0057
2024/0238154 A1 * 7/2024 Liu ........................ A61H 9/005

* cited by examiner

*Primary Examiner* — Tu A Vo
*Assistant Examiner* — Kelsey E Baller
(74) *Attorney, Agent, or Firm* — Hemisphere Law, PLLC; Zhigang Ma

(57) ABSTRACT

A negative pressure massager includes a handle; one end of the handle is internally provided with a cavity, and a through hole is provided in one end; a control board, a battery connected to the control board, a button for adjusting a working state of the control board, and a display indicator lamp are arranged in the handle; the negative pressure assembly partially passes through the through hole; the negative pressure assembly includes a negative pressure pipe arranged on the handle, and a piston part driven to move by the control board; and the piston part is arranged in the negative pressure pipe and compresses air in the negative pressure chamber in a movement process to generate a negative pressure for massaging.

16 Claims, 12 Drawing Sheets

NEGATIVE PRESSURE MASSAGER AND MASSAGE METHOD

TECHNICAL FIELD

The present disclosure relates to the field of massagers of adult products, and in particular, to a negative pressure massager and a massage method.

BACKGROUND

With the improvement of the living standard and the increasing stress on people in their lives and work, adult health products are becoming more and more popular. People are investing more and more energy into their own health and the comfort of their living processes. In this environment, various health and massage products specifically designed for adults have been promoted and applied, among which, a simulated massager for women is very common. It provides the possibility of releasing some stress for single adult women or women living in separate places from their mates for long time. The traditional simulated massager not only includes a simulated massage body, but also has a vibration motor inside to achieve active massage. This massager greatly improves the convenience of use and improves the comfort. However, the traditional massager usually only has a vibration massage function, and still lacks the ability to mimic human movements, so this massager is not user-friendly enough, which brings drawbacks to users.

SUMMARY

The technical problem to be solved in the present disclosure is that a traditional massager usually only has a vibration massage function, and still lacks the ability to mimic human movements, so this massager is not user-friendly enough, which brings drawbacks to users. For the above defect in the prior art, a negative pressure massager and a massage method are provided.

In order to solve the above technical problems, the present discloses uses the following technical solutions:

A negative pressure massager is provided. The negative pressure massager includes a handle; one end of the handle is internally provided with a cavity, and a through hole is provided in one end; a control board, a battery connected to the control board, a button for adjusting a working state of the control board, and a display indicator lamp are arranged in the handle; a negative pressure assembly is arranged in the handle; the negative pressure assembly partially passes through the through hole; the negative pressure assembly includes a negative pressure pipe arranged on the handle, and a piston part driven to move by the control board; a negative pressure chamber is formed between the piston part and the negative pressure pipe; and the piston part is arranged in the negative pressure pipe and compresses air in the negative pressure chamber in a movement process to generate a negative pressure for massaging.

A massage method is provided. The massage method is based on the structure of the above negative pressure massager, and a massage end is driven by a driving mechanism to move for massaging.

The present disclosure has the following beneficial effects: The rotation of the motor drives the movable rod to move up and down, so as to push the piston part to move, thereby changing the negative pressure in the negative pressure chamber for massaging. The guide structure arranged between the piston part and the negative pressure pipe improves the stability in the movement process, so that the massage is steadier, and the massage experience is better. Furthermore, the handle is provided with the outer shell and the inner shell, which also reduces vibrations, caused in a working process of the motor, on the hand. Meanwhile, the connection between the spherical end portion of the movable rod and the accommodating hole improves the stability and reduces the motion noise.

DETAILED DESCRIPTION OF THE EMBODIMENTS

Figure 1:
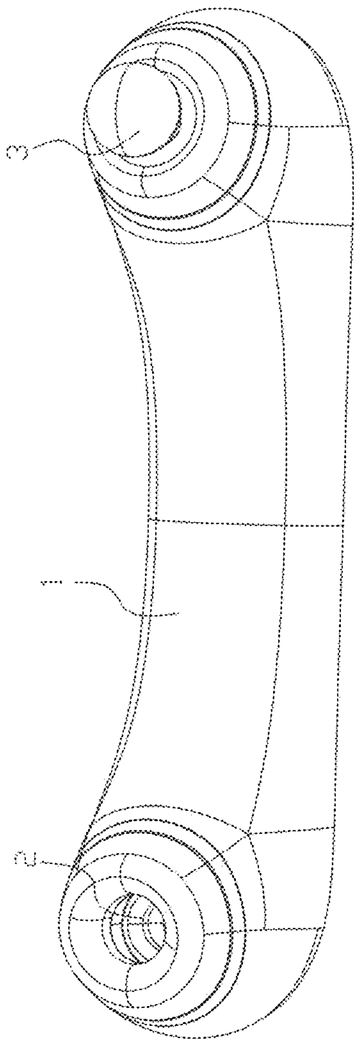
FIG. 1 is a three-dimensional structural diagram of a massager according to the present disclosure.
Figure 2:
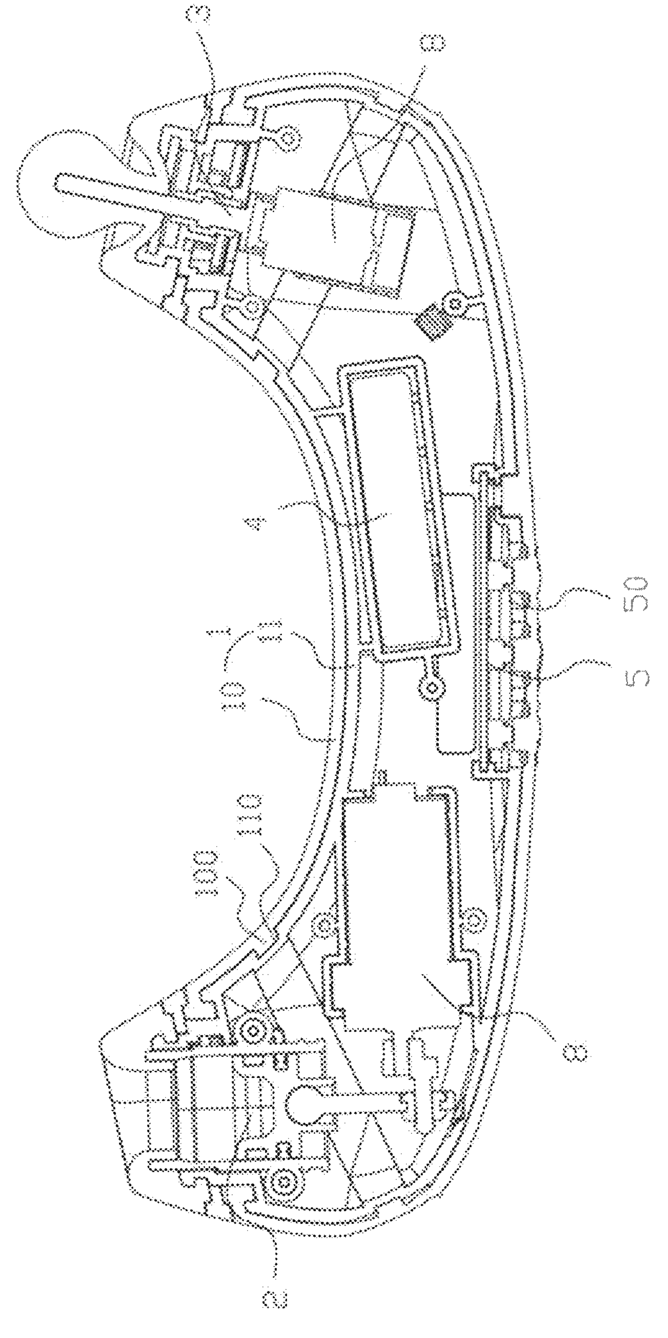
FIG. 2 is a sectional structural diagram of a massager according to the present disclosure.

A negative pressure massager of a preferred embodiment of the present disclosure is provided. As shown in FIG. 1 to FIG. 2, the negative pressure massager includes a handle 1. One end of the handle is connected to a negative pressure assembly 2, and the other end is connected to a telescopic assembly 3. The telescopic assembly can extend and contract for massaging. The negative pressure assembly changes its internal negative pressure in a movement process for massaging, so that the diversity of work of the massager and making it more functional.

Figure 3:
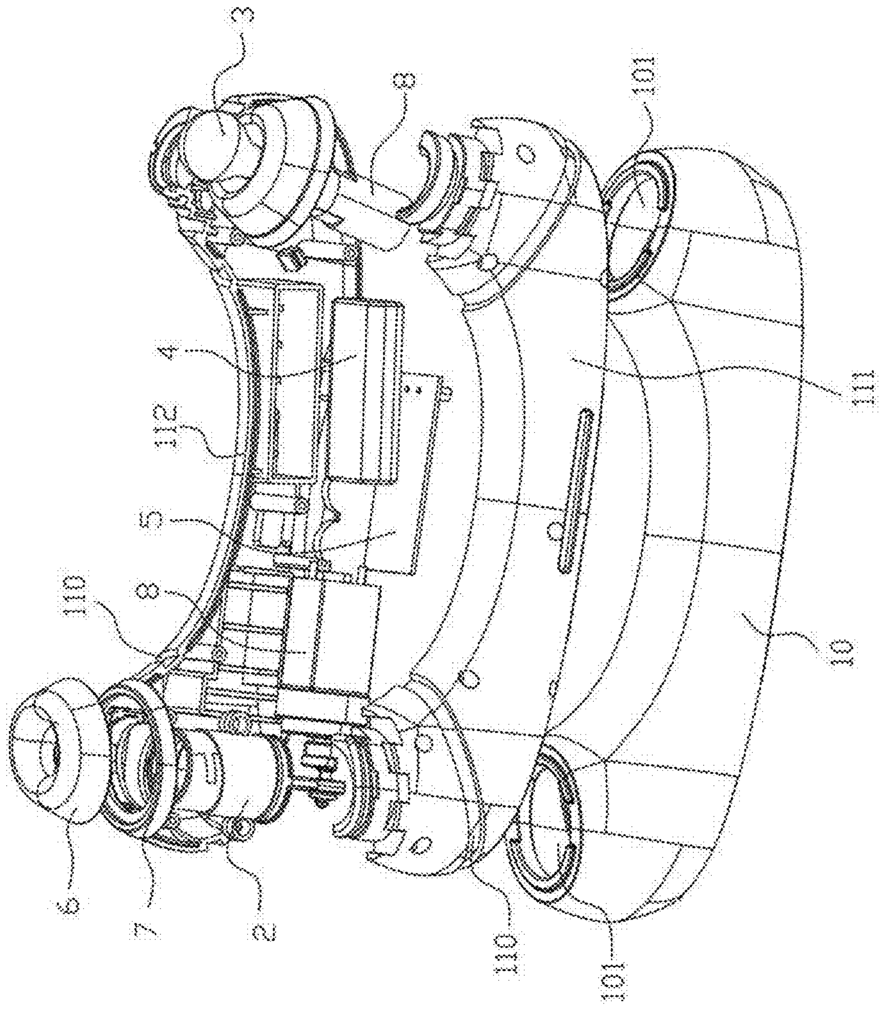
FIG. 3 is an exploded structural diagram of a massager according to the present disclosure.
Figure 4:
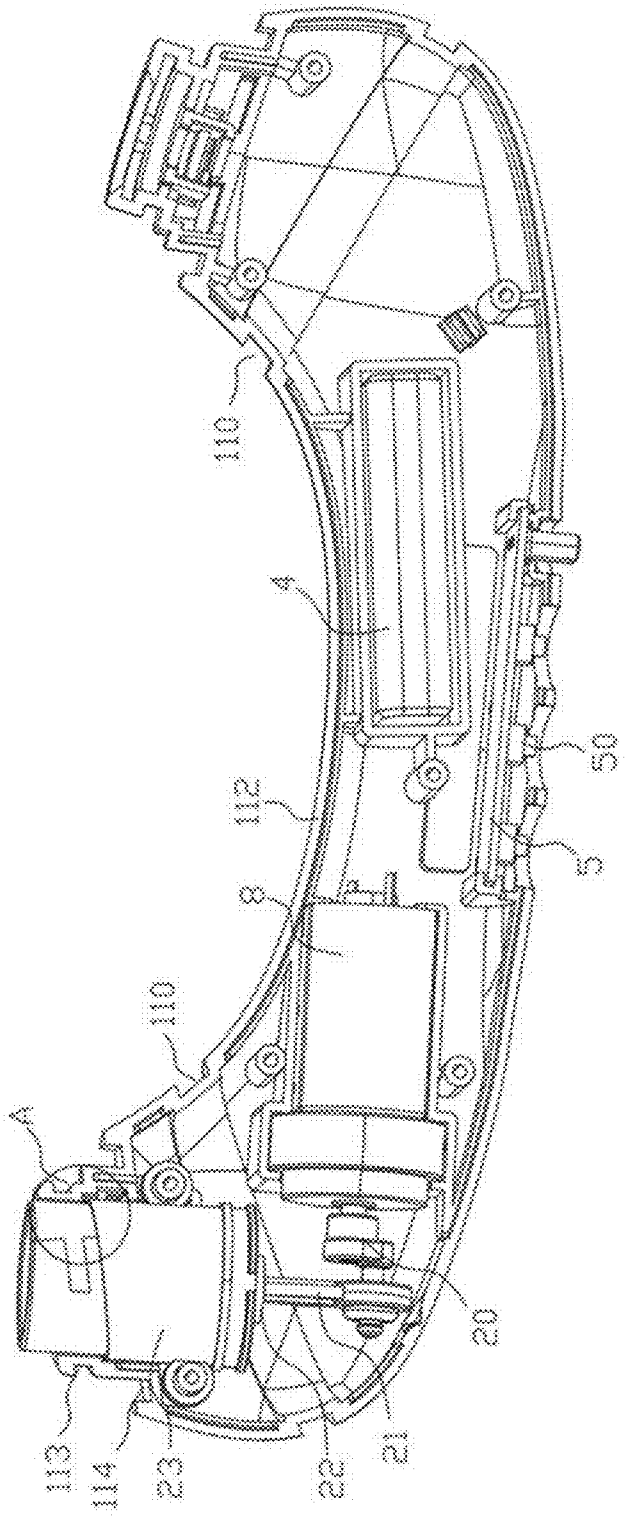
FIG. 4 is a partially structural diagram of a massager according to the present disclosure.
Figure 5:
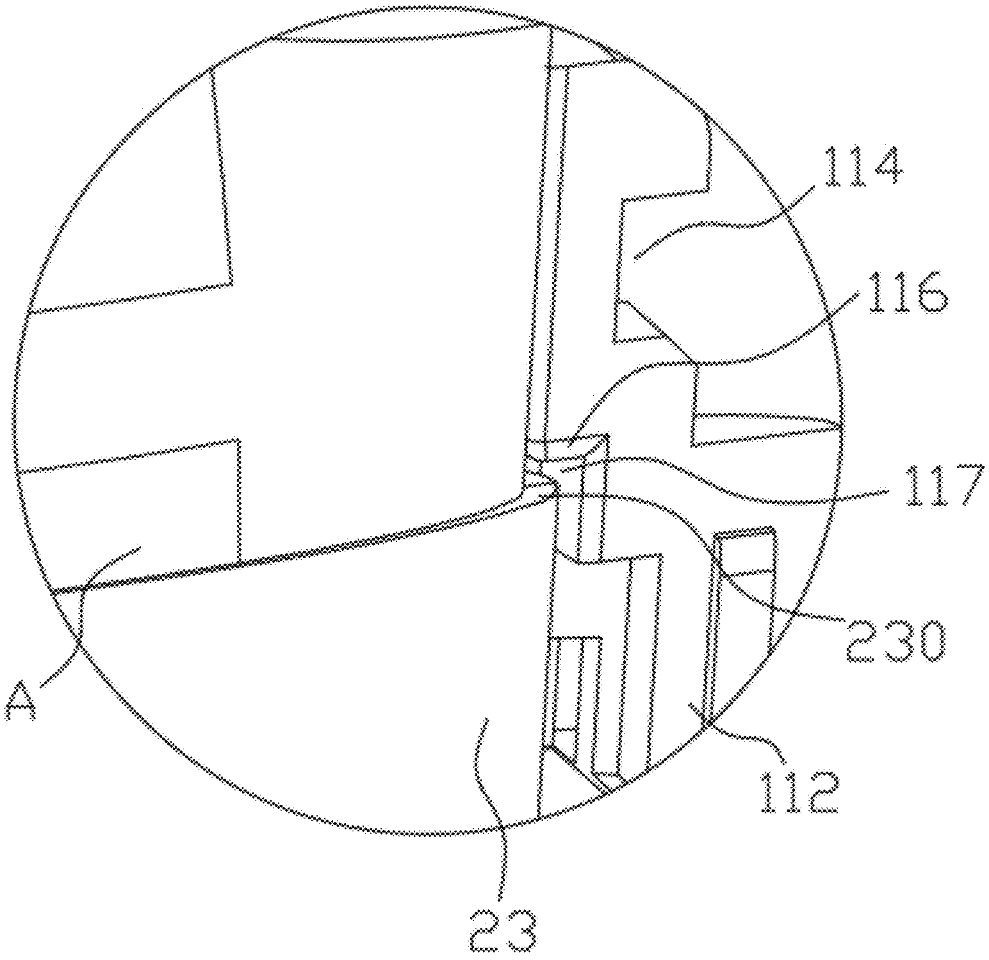
FIG. 5 is an enlarged structural diagram of part A in FIG. 4 according to the present disclosure.
Figure 6:
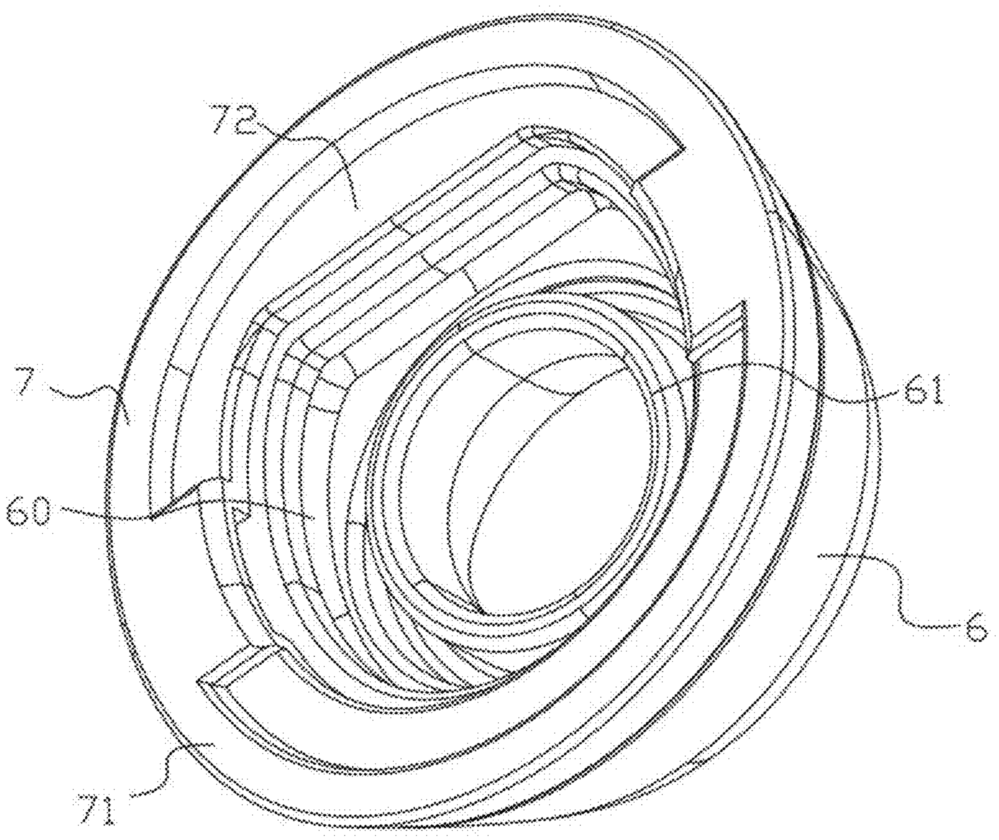
FIG. 6 is a structural diagram of a removable head and a sealing ring according to the present disclosure.

Specifically, as shown in FIG. 2 to FIG. 3, the handle 1 includes an outer shell 10, and an inner shell 11 arranged in the outer shell. An outer shell bulge loop 100 is arranged on an inner surface of the outer shell. An inner shell groove 110 is correspondingly arranged at the inner shell. Through the limiting effect of the bulge loop and the groove, the movement of the outer shell relative to the inner shell is avoided, and the negative pressure massager is used more stably. The inner shell 11 is formed by connecting a front inner shell 111 and a rear inner shell 112. A control board 5, a battery 4 connected to the control board, and two groups of motors 8 connected to the control board are arranged in the inner shell. The two groups of motors are separately connected to the negative pressure assembly 2 and the telescopic assembly 3, and can drive the negative pressure assembly to generate a negative pressure for massaging and drive the telescopic assembly to extend and contract for massaging. Through holes 101 are provided at two ends of the inner shell and two ends of the outer shell. Both the negative pressure assembly and the telescopic assembly are connected to the handle. The control board 5 is connected with a button 50 passing through the outer shell and an indicator lamp for displaying a working state of the massager. Through the button, the negative pressure assembly or the telescopic assembly can be adjusted to work, and a working shift of the negative pressure assembly or the telescopic assembly can be adjusted. In conjunction with different colors or flickering state of the indicator lamp, corresponding modes can be observed. This is more convenient and clearer.

Figure 7:
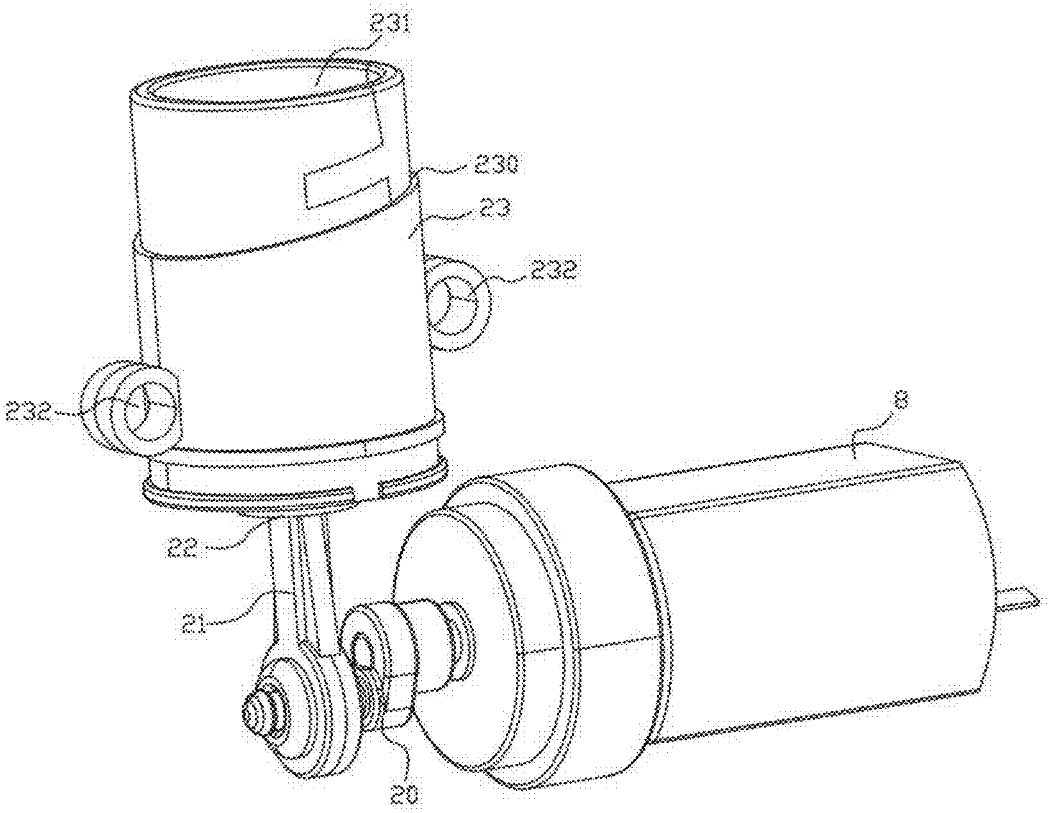
FIG. 7 is a structural diagram of connection between a negative pressure assembly and a motor according to the present disclosure.
Figure 8:
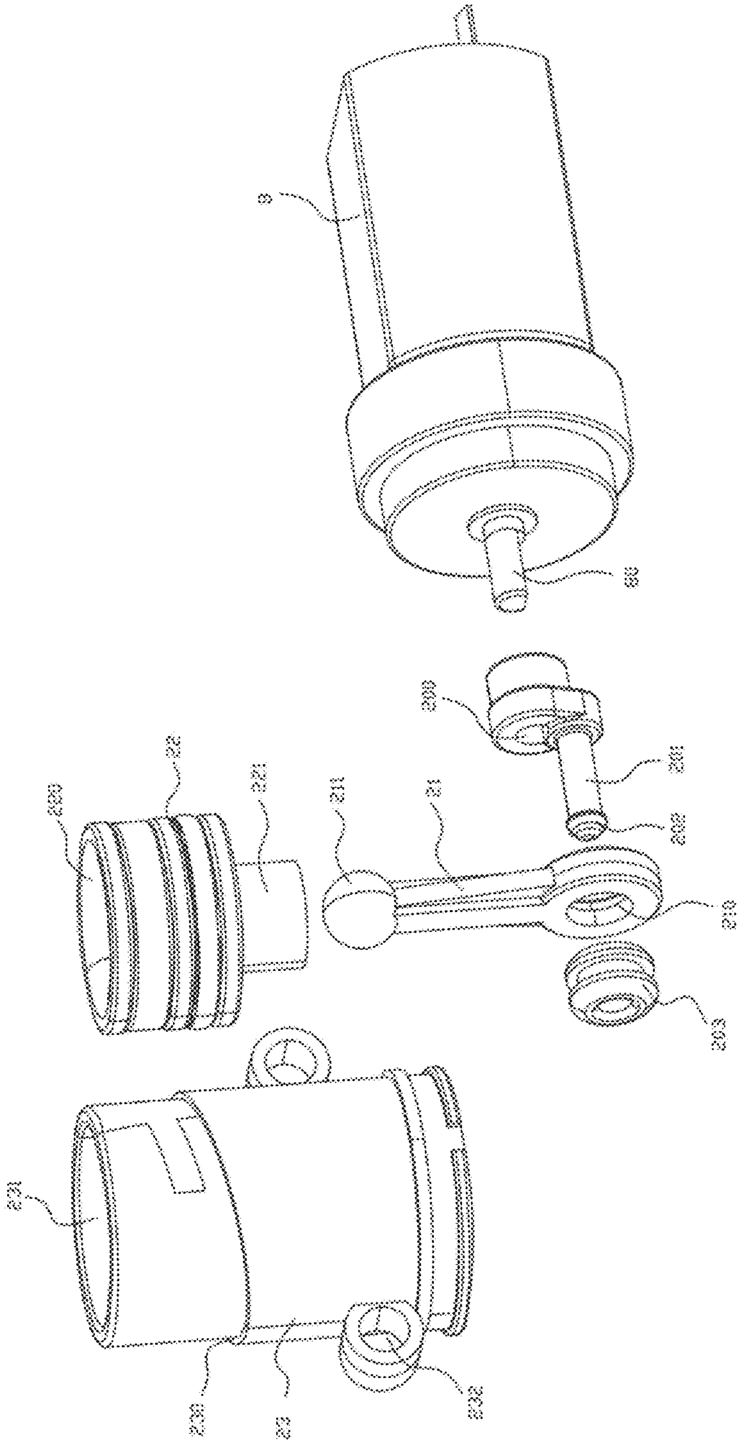
FIG. 8 is an exploded structural diagram of a negative pressure assembly and a motor according to the present disclosure.
Figure 9:
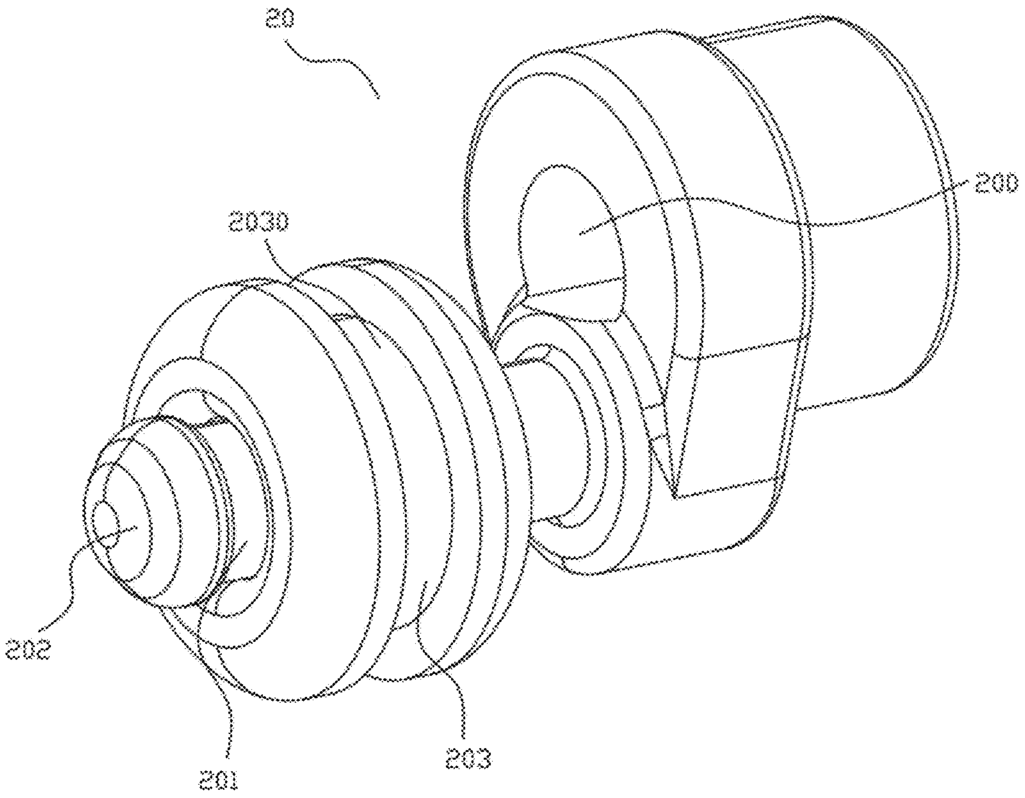
FIG. 9 is a structural diagram of a driven member according to the present disclosure.
Figure 10:
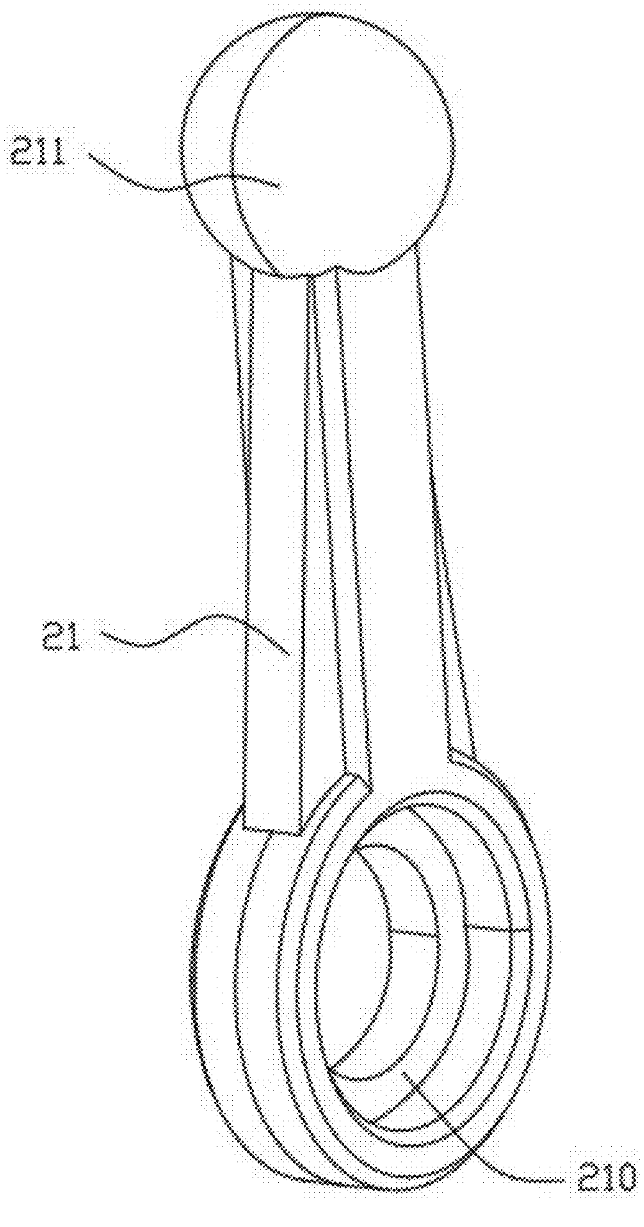
FIG. 10 is a structural diagram of a movable rod according to the present disclosure.

Further, as shown in FIG. 7 to FIG. 8, the negative pressure assembly 2 includes a driven member 20 connected to the motor 8. The driven member rotates with a motor shaft 80 and drives the movable rod 21 to move up and down. An end portion of the movable rod is connected to a piston part 22, and the piston part is arranged in a negative pressure pipe 23. The negative pressure pipe is fixedly connected to the inner shell, and the movable rod moves up and down to drive the piston part to move up and down in the negative pressure pipe, thereby changing a negative pressure in a negative pressure chamber 231 and achieving a negative pressure massage effect. As shown in FIG. 8, the motor shaft 80 is non-circular, and a connecting hole 200 connected to the motor shaft is provided on the driven member 20. The connecting hole drives the driven member to rotate with the motor shaft. The driven member further includes a rotating rod 201. The rotating rod rotates with the motor shaft and moves along a moving trajectory using the motor shaft as a circle center. The rotating rod 201 is sleeved with the movable rod 21, and the movable rod moves up and down as the rotating rod rotates. A lower end of the piston part 23 is connected to the movable rod, and a sunken chamber 220 is provided at an upper end. The piston part is arranged in the negative pressure pipe. The movable rod pushes the piston part to move up and down in the negative pressure pipe, so that a negative pressure is generated in the negative pressure chamber for massaging.

Further, as shown in FIG. 7 to FIG. 10, to improve the stability of the piston part in the up-and-down movement process, a rubber ring 203 sleeves the rotating rod 201, and a ring fixing groove 2030 is provided on the rubber ring. A limiting part 210 corresponding to the rubber ring groove is arranged on the movable rod to sleeve the movable rod on a fixed rod to prevent the movable rod from being loosened. Meanwhile, the rubber ring can play a role in wear resistance and noise reduction, and lubricating oil can be injected onto the rubber ring to reduce the friction between the rubber ring and the inner shell. Furthermore, a hemispherical end portion 202 is arranged at an end portion of the rotating rod, and a radius of the hemispherical end portion is greater than a radius of the rotating rod, so that falling off of the rubber ring is avoided. A spherical end portion 211 is arranged at an upper end of the movable rod, and an accommodating hole 221 corresponding to the spherical end portion is provided at a lower end of the piston part. In the present disclosure, the piston part is pushed by the movable rod to move upwards, and the piston part is pushed by a massage portion of the massager to move downwards to be reset, thus achieving repeated massage actions. The spherical end portion may be sleeved in the accommodating hole 221. The movable rod drives the piston part to move up and down, so that the massage effect is better. Furthermore, the massage feeling is more obvious, and the comfort is higher. The spherical end portion 211 achieves uniform movement, thus improving the stability of the up-and-down movement and reducing the noise.

Figure 11:
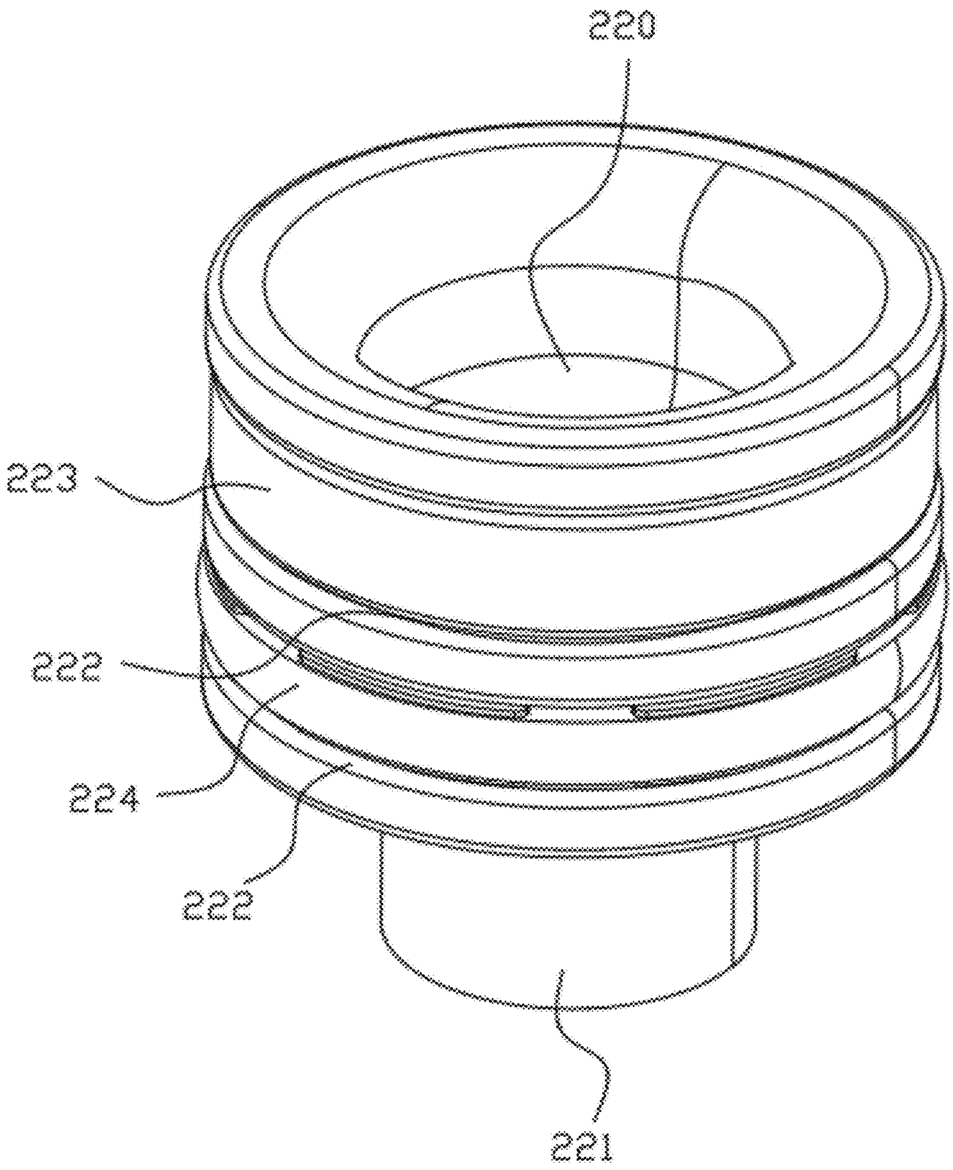
FIG. 11 is a structural diagram of a piston part according to the present disclosure.
Figure 12:
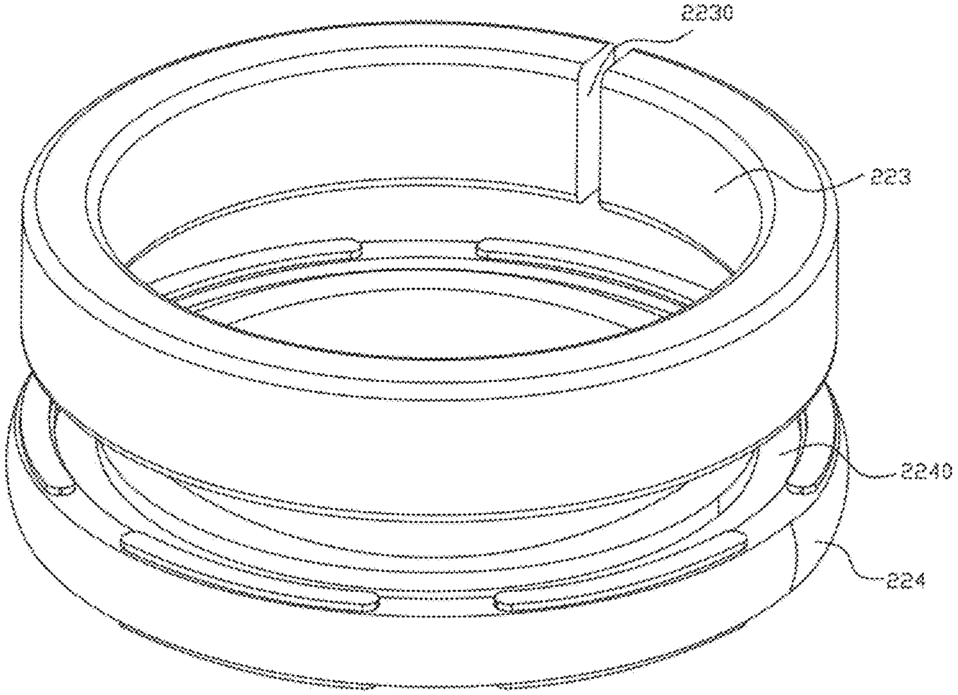
FIG. 12 is a structural diagram of a guide ring according to the present disclosure.

Furthermore, as shown in FIG. 11 to FIG. 12, a guide slot 222 is provided on an outer side surface of the piston part 22, and a guide ring is arranged at the guide slot to guide the movement of the piston part in the negative pressure chamber, thereby balancing the stability of the up-and-down movement. A movable end 2230 is arranged on one side of a guide ring 223, which facilitates the replacement of the guide ring and further improves the stability of guiding. The piston part is prevented from skewing left and right, and the resistance to the up-and-down movement is reduced, so that the resistance to the up-and-down movement of the piston part is reduced. Suction slots 2240 are provided at both a top and a bottom of a sealing ring 224. A suction force is generated between the suction slots and the piston part to improve the connection tightness between the sealing ring and the piston part. Due to the arrangement of two groups of guide rings, the airtightness of the connection between the piston part and the negative pressure pipe is better, and the guide rings play a guide role for the movement of the piston part in the negative pressure pipe, making the movement more stable. When the driven member moves, the driven member will swing left and right. The resistance to the left-right swinging of the driven member is reduced through the guide rings. Because the guide rings are in hard contact, the resistance can be reduced, and the impact of low current start energy consumption of the motor can be reduced too.

Further, as shown in FIG. 4 to FIG. 8, two groups of fixed lugs 232 are arranged on left and right sides of the negative pressure pipe 23, and the fixed lugs sleeve the fixed column to connect the negative pressure pipe with the inner shell. The inner shell is made of a silica gel material. There is still a possibility that the fixed lugs shake. Therefore, an upper step 230 is arranged at an upper end of the negative pressure pipe, and a lower step 116 corresponding to the upper step is arranged at the inner shell. A gap 117 is reserved between the upper and lower steps, so that the negative pressure pipe can move within a distance range of the gap, and the service life of the massager is prolonged. When the piston part moves up and down, the upper step is driven all the time to move a certain distance in the gap. The upper step stops moving until it is in contact with the lower step. For the convenience of using the negative pressure assembly, a removable head 6 is arranged outside a part of the negative pressure assembly extending out of the through hole 101, and a sealing ring 7 is connected between the removable head and the inner shell. A lower groove 114 is provided on the inner shell 11, and a lower bulge loop 71 corresponding to the lower groove is arranged on the sealing ring to connect the sealing ring with the inner shell. A limiting block is further arranged in the sealing ring to prevent the sealing ring from rotating. Meanwhile, a foolproof part 72 is arranged on the sealing ring to ensure that the mounting direction of the sealing ring is unique. A clamping slot 113 corresponding to the removable head is arranged on a side surface of the inner shell. A clamping ring 60 is arranged on the removable head, so that the removable head is detachably connected to the inner shell, facilitating cleaning after removal of the removable head. Meanwhile, a sealing pipe 61 corresponding to the negative pressure pipe is arranged in the removable head. The airtightness in the negative pressure pipe increases due to the contact between an outer wall of the sealing pipe and an inner wall of the negative pressure pipe.

During use, the massager is arranged at a part to be massaged. The button is controlled to enable the motor to work. At this time, the negative pressure assembly starts to work. One end of the removable head abuts against the skin. When the motor 8 works, the motor shaft 80 rotates and drives the driven member 20 to rotate. In this case, the rotating rod moves in a circular trajectory using the motor shaft as a circle center. The movable rod 21 connected to the rotating rod 201 moves up and down. During the upward movement, the movable rod pushes the piston part to move upwards and compress the air in the negative pressure chamber, thus achieving negative pressure massaging. During the downward movement, a user breathes to push the piston part to move downwards and be reset, and the movable rod moves upwards, thus achieving cyclic negative pressure messaging. Or, the movable rod can move downwards and drive the piston part to move downwards, which actively changes the negative pressure in the negative pressure chamber, so that the massage and use effect is better. Meanwhile, in the movement process, the guide rings guide the piston part to move in the negative pressure pipe, making the movement more stable and achieving better negative pressure balance. The telescopic assembly arranged at the other end can be further used for massaging as needed. After use, the removable head can be removed for cleaning and is then mounted for next use, improving convenience.

A negative pressure massage method of a preferred embodiment of the present disclosure is provided. A motor rotates and drives a piston part to move in a negative pressure pipe, thus achieving a negative pressure massage effect. The method is based on the structure of the above negative pressure massager. The specific structure is as described above and will not be elaborated here.

What is claimed is:

1. A negative pressure massager, comprising a handle, wherein the handle is internally provided with a cavity, and a through hole is provided in one end; a control board, a battery connected to the control board, a button for adjusting a working state of the control board, and a display indicator lamp are arranged in the handle; a negative pressure assembly is arranged in the handle; the negative pressure assembly partially passes through the through hole; the negative pressure assembly includes a negative pressure pipe arranged on the handle, and a piston part driven to move by the control board; a negative pressure chamber is formed between the piston part and the negative pressure pipe; the piston part is arranged in the negative pressure pipe and compresses air in the negative pressure chamber in a movement process to generate a negative pressure for massaging; a guide structure is arranged between the piston part and the negative pressure pipe; the guide structure plays a guide role for the movement of the piston part in the negative pressure pipe; an accommodating hole is provided at a lower end of the piston part; a spherical end portion arranged in the accommodating hole is arranged at an upper end of a movable rod; and the movable rod moves upwards to drive the piston part to move upwards and compress the air in the negative pressure chamber;

wherein the guide structure comprises a guide ring and a sealing ring; a guide slot corresponding to the guide ring is provided on a side surface of the piston part; and an outer wall of the guide ring is in close contact with an inner wall of the negative pressure pipe and is able to move up and down on the inner wall of the negative pressure pipe; the guide ring is not in closed connection; sealing slots are provided on an upper side and a lower side of the sealing ring; and the sealing slots increase a contact force between the sealing ring and the piston part.

2. The negative pressure massager according to claim 1, wherein a motor connected to the control board and a driven member connected to the motor and driven to rotate by the motor are arranged in the handle; the driven member is connected with the movable rod; the driven member rotatably drives the movable rod to move up and down; and the movable rod pushes the piston part to move in the negative pressure pipe to change the negative pressure in the negative pressure chamber.

3. The negative pressure massager according to claim 2, wherein the driven member comprises a connecting hole connected to a motor shaft and a rotating rod rotating with the motor shaft; and the rotating rod rotates using the motor shaft as a circle center and a projection distance from the rotating rod to the rotating shaft of the motor as a radius under the action of the motor shaft.

4. The negative pressure massager according to claim 3, wherein a rubber ring is arranged on the rotating rod; the movable rod is connected to the rotating rod through a fixed ring and moves up and down with the rotation of the rotating rod; and the motor shaft is non-circular, so as to drive the driven member to rotate.

5. The negative pressure massager according to claim 4, wherein a hemispherical end portion is provided at an end portion of the rotating rod, and a radius of the hemispherical end portion is greater than a radius of the rotating rod, so that the rubber ring sleeves the rotating rod.

6. The negative pressure massager according to claim 5, wherein a fixed slot is provided on the rubber ring, and the movable rod is arranged at the fixed slot and is connected to the rubber ring.

7. The negative pressure massager according to claim 1, wherein the accommodating hole fixes the movable rod and drives the piston rod to move when the movable rod moves downwards.

8. The negative pressure massager according to claim 1, wherein a concave chamber is arranged at an upper end of the piston part; and the negative pressure of the air in the negative pressure chamber is changed through movement of the concave chamber for negative pressure massaging.

9. The negative pressure massager according to claim 8, wherein a fixed column is arranged in the handle; fixed lugs connected to the fixed column are arranged on two sides of the negative pressure pipe; an upper step is arranged on the negative pressure pipe; a lower step corresponding to the upper step is arranged in the handle; and a gap is reserved between the upper step and the lower step.

10. The negative pressure massager according to claim 1, wherein the handle comprises an outer shell, and an inner shell arranged in the outer shell; the negative pressure assembly is connected to the inner shell; and a limiting structure is arranged at a connection between the outer shell and the inner shell.

11. The negative pressure massager according to claim 10, wherein a removable head is arranged on the outer shell; the removable head is hollow; the negative pressure assembly is partially placed on the removable head; and a second sealing ring is connected between the removable head and the inner shell.

12. The negative pressure massager according to The negative pressure massager according to wherein a positioning part is arranged at a connection between the second sealing ring and the inner shell; a sealing slot is provided on the inner shell; and a clamping slot corresponding to the sealing slot on the inner shell is provided on the second sealing ring.

13. The negative pressure massager according to claim 1, wherein a telescopic assembly is arranged at another end of the handle; the telescopic assembly is connected to the control board; and the telescopic assembly is driven to move up and down by the control board for massaging.

14. A massage method, wherein the massage method is based on the negative pressure massager as claimed in claim 1, and a massage end is driven by a driving mechanism to move for massaging.

15. The massage method according to claim 14, wherein the driving mechanism drives the massage end to move downwards for massaging or a massage part drives the massage end to move downwards.

16. The massage method according to claim 15, wherein the massage end comprises a telescopic assembly and a negative pressure assembly; the driving mechanism drives the telescopic assembly to move up and down for massaging, or drives the negative pressure assembly to move to change the negative pressure for massaging.

* * * * *